United States Patent
Park et al.

(10) Patent No.: US 7,440,849 B2
(45) Date of Patent: Oct. 21, 2008

(54) METHOD FOR MANAGING MAP DATA FOR VEHICLE

(75) Inventors: Chang Won Park, Seoul (KR); Young In Kim, Jinhae-Si (KR); Moon Jeung Joe, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 712 days.

(21) Appl. No.: 10/964,417

(22) Filed: Oct. 12, 2004

(65) Prior Publication Data

US 2005/0085996 A1    Apr. 21, 2005

(30) Foreign Application Priority Data

Oct. 20, 2003    (KR) ................ 10-2003-0072854

(51) Int. Cl.
G01C 21/32    (2006.01)
G08G 1/37    (2006.01)

(52) U.S. Cl. ............... 701/208; 701/211; 340/995.14; 340/995.17

(58) Field of Classification Search ........... 701/208, 701/211, 213, 201, 209; 340/995.1, 995.14, 340/995.17, 995.18, 995.22, 995.28; 345/660
See application file for complete search history.

(56) References Cited

U.S. PATENT DOCUMENTS

| | | | | |
|---|---|---|---|---|
| 4,550,317 A | * | 10/1985 | Moriyama et al. | ..... 340/995.15 |
| 4,742,558 A | * | 5/1988 | Ishibashi et al. | ........... 382/240 |
| 5,444,618 A | * | 8/1995 | Seki et al. | ...................... 702/5 |
| 5,523,765 A | | 6/1996 | Ichikawa | |
| 5,893,898 A | * | 4/1999 | Tanimoto | ................... 701/201 |
| 6,125,367 A | * | 9/2000 | Na | ........................... 707/104.1 |
| 6,334,088 B1 | * | 12/2001 | Taniguchi et al. | ........... 701/208 |
| 6,604,046 B1 | | 8/2003 | Watermulen et al. | |
| 2004/0034469 A1 | * | 2/2004 | Kim | ........................... 701/208 |

FOREIGN PATENT DOCUMENTS

| EP | 0 510 939 A2 | 4/1992 |
|---|---|---|
| EP | 0 945 706 A2 | 9/1999 |

* cited by examiner

Primary Examiner—Tan Q Nguyen
(74) Attorney, Agent, or Firm—Lee, Hong, Degerman, Kang & Schmadeka

(57) ABSTRACT

The present invention relates to a method for managing map data for a vehicle using a navigation system, wherein upon display of the map data, memory loading for the display of the map data can be quickly performed by reducing the number of access to a physical storage medium with an entire map stored therein.

To this end, when a travel guide map is generated again based on a new location as the position of a vehicle varies, only a certain number of map segments are retrieved from a physical storage medium such as a CD-ROM to generate the travel guide map, thereby making map-displaying speed faster. Further, when the travel guide map is generated again based on the new location as the position of the vehicle varies, map data loading speed can be faster by preventing reusable map segments among map segments loaded on an operation memory from being unnecessarily deleted, retrieved again from the physical storage medium and inserted into the operation memory.

40 Claims, 8 Drawing Sheets

METHOD FOR MANAGING MAP DATA FOR VEHICLE

CROSS-REFERENCE TO RELATED APPLICATIONS

Pursuant to 35 U.S.C. § 119(a), this application claims the benefit of earlier filing date and right of priority to Korean Application No. 2003-0072854, filed on Oct. 20, 2003, the contents of which are hereby incorporated by reference herein in their entirety.

BACKGROUND OF THE INVENTION

1. Field of the Invention

The present invention relates to a method for managing map data for a vehicle, wherein upon display of map data on a display unit by using a navigation system, memory loading for the display of the map data can be quickly performed by reducing the number of access to a physical storage medium with an entire map stored therein.

2. Description of the Related Art

Generally, a navigation system provides functions of calculating a current location of a traveling vehicle using radio signals transmitted by a plurality of satellites belonging to a global positioning system and signals transmitted by sensors of the vehicle, and guiding the vehicle along an optimum path from a starting place to a destination by map-matching the calculated position to map data.

Particularly, in a full navigation system for guiding a vehicle along a path by displaying the path as well as the position of the vehicle, loading of a nationwide map and relevant map data is inevitably required in order to search for a path, guide a travel and visualize a map.

However, due to a large amount of map data and limitations on hardware, it is practically impossible to load such map data on a screen memory. This will be described in detail by way of example with reference to FIG. 1.

FIG. 1 is a view showing a conventional system for managing and displaying map data for a vehicle. As shown in the figure, in the conventional system for managing and displaying map data for a vehicle, when a GPS receiver 100 detects data on the position of the vehicle by receiving GPS data, a control unit 150 retrieves map data related to the position data from a physical storage medium 120 such as a CD-ROM or hard disk. A display driving unit 130 generates a travel guide map for the vehicle using map data retrieved under the control of the control unit 150 in response to input of user command data through a user command input unit 110 so that the map can be displayed on a display unit 140.

However, in such a conventional map data management, map data of a new area should be continuously loaded from a physical storage medium such as a CD-ROM as a vehicle travels. Time required for loading the map data from the physical storage medium causes a considerable delay upon display of a travel guide map for the vehicle.

Therefore, to avoid the time delay of the display, there is a need for improving speed at which the travel guide map is displayed, by minimizing access overhead through reduction in the number of access to the physical storage medium.

SUMMARY OF THE INVENTION

Accordingly, the present invention is conceived to meet the aforementioned need. An object of the present invention is to provide a method for managing map data for a vehicle, wherein upon display of the map data, memory loading for the display of the map data can be quickly performed by reducing the number of access to a physical storage medium with an entire map stored therein.

In the present invention for achieving the above object, when a travel guide map is generated again based on a new location as the position of a vehicle varies, only a certain number of map segments are retrieved from a physical storage medium such as a CD-ROM or hard disk to generate the travel guide map, thereby making map-displaying speed faster.

Further, when the travel guide map is generated again based on the new location as the position of the vehicle varies, map data loading speed can be faster by preventing reusable map segments among map segments loaded on an operation memory from being unnecessarily deleted, retrieved again from the physical storage medium and inserted into the operation memory.

Moreover, when the travel guide map is generated again based on the new location as the position of the vehicle varies, a certain number of necessary map segments are detected and updated into the operation memory so that the updated map segments can be retrieved from the operation memory and then loaded on a screen memory, thereby making map data loading speed faster.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of the present invention will be described in detail with reference to the accompanying drawings.

First to third embodiments of the present invention will be sequentially described in connection with a navigation system shown in FIG. 2.

Figure 1:
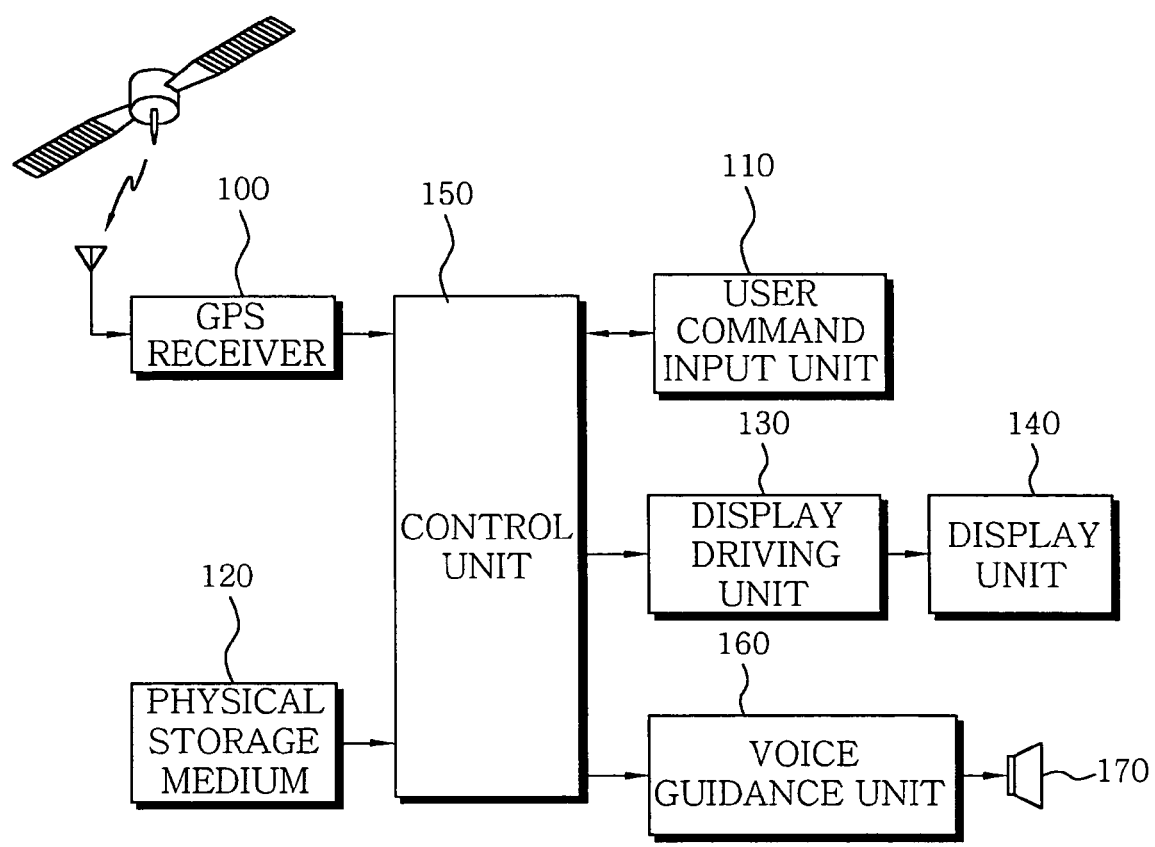
FIG. 1 is a view showing a conventional system for managing map data for a vehicle.
Figure 2:
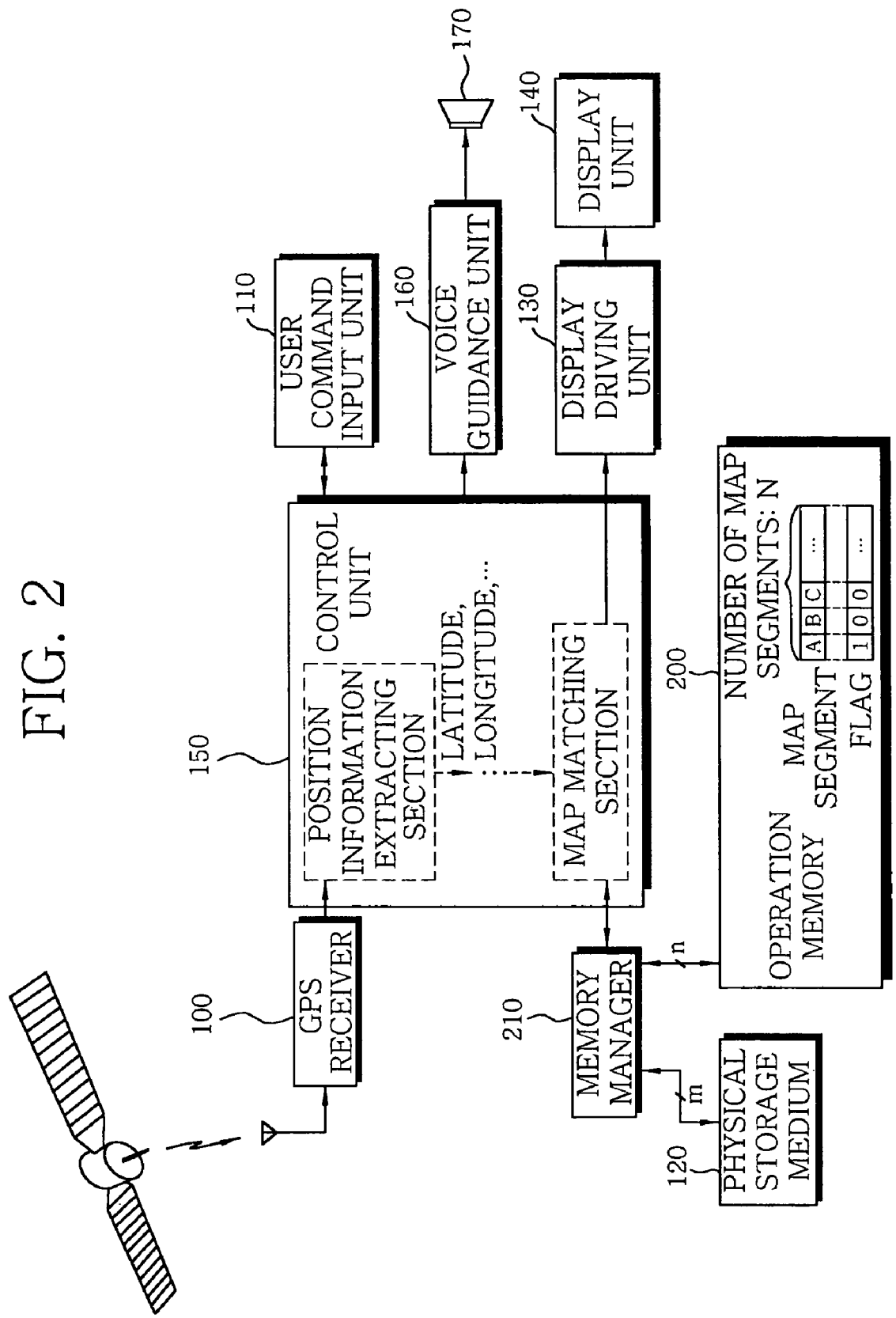
FIG. 2 is a view showing a system for managing map data for a vehicle to which the present invention is applied.

As shown in FIG. 2, the navigation system to which the embodiments of the present invention is applied comprises a GPS receiver 100 for calculating data on the position of a vehicle by receiving GPS data transmitted by three or more GPS satellites; a user command input unit 110 for receiving predetermined command data input in response to user's manipulation; a physical storage medium 120 for storing a large amount of data of an entire map consisting of a plurality of map segments; an operation memory 200 for dynamically storing a predetermined number of map segments; a memory manager 210 for managing the map segments stored in the operation memory 200, for example, sequentially inserting map segments into the operation memory 200 or deleting them from the operation memory 200 in a first-in first out (FIFO) manner; a display driving unit 130 for causing a current location and a travel path of the vehicle together with map data to be displayed on a display unit 140; a voice guidance unit 160 for guiding the travel path of the vehicle using voice signals through a speaker 170; and a control unit 150 for controlling the respective units.

The term "map segment" used herein is defined as partial map data obtained by uniformly dividing a certain entire map into segments with a predetermined size based on latitude and longitude. Respective map segments are identified by identification numbers.

The first embodiment of the present invention will be described below in connection with the navigations system described above.

FIRST EMBODIMENT

In the first embodiment of the present invention, when a travel guide map is generated again based on a new location as the position of a vehicle varies, only a certain number of map segments are retrieved from a physical storage medium such as a CD-ROM or hard disk to generate the travel guide map, thereby making map-displaying speed faster.

To this end, in the first embodiment of the present invention, map segments usable for displaying a travel guide map based on a current vehicle location are selected among a predetermined number of map segments that have been loaded in the operation memory 200 to display a travel guide map based on a previous location.

That is, in the first embodiment of the present invention, when the GPS receiver 100 receives GPS data and calculates coordinates of a current vehicle location, a central map segment including the calculated coordinates of the location and a predetermined number of adjacent map segments surrounding the central map segment are detected to display a map with a predetermined size on the display panel.

Then, map segments identical with the detected central map segment and the adjacent map segments are selected, as map segments usable for displaying a travel guide map based on a current vehicle location, among the predetermined number of map segments that have been loaded in the operation memory 200 to display the travel guide map based on the previous location.

At this time, it is preferred that the adjacent map segments be sequentially detected according to the degree of proximity to the central map segment, and an entire map divided into map segments with a predetermined size based on latitude and longitude be used.

Meanwhile, the map segments selected as being usable for displaying the travel guide map based on the current vehicle location are designated as properties, and remaining map segments are designated as victims.

At this time, it is preferred that predetermined different marks be assigned to the respective map segments designated as properties and victims so as to identify them. For example, it is preferred that a binary bit flag of "1" be assigned to the properties, while a binary bit flag of "0" be assigned to the victims. The marks are initialized whenever the position of the vehicle varies.

In the first embodiment of the present invention, as for the map segments designated as the properties, they are reinserted into the operation memory 200 even though they have been deleted from the operation memory 200 in a predetermined order, e.g., in a first-in first-out (FIFO) manner. For example, the map segments designated as the properties are deleted at their turns in the FIFO manner. The deleted map segments are added to an insertion queue, and the map segments added to the insertion queue are reinserted into the operation memory 200 in a relevant order.

Then, the map segments designated as the victims are completely deleted from the operation memory 200, and remaining map segments required for displaying the travel guide map based on the current vehicle location are retrieved from the physical storage medium 120 with the entire map stored therein and are then updated into the operation memory 200. At this time, the map segments designated as the victims are deleted from the operation memory 200 in the practicable FIFO manner, and the map segments retrieved from the physical storage medium 120 are inserted into the operation memory 200.

The map segments updated into the operation memory in such a manner, and the map segments designated in advance as the properties are loaded on a screen memory.

As a result, according to the first embodiment of the present invention, when a travel guide map is generated again based on a new location as the position of the vehicle varies, only a certain number of map segments are retrieved from the physical storage medium such as a CD-ROM or hard disk to generate the travel guide map, thereby making map-displaying speed faster.

Next, the second embodiment of the present invention will be described with reference to FIG. 2.

The second embodiment of the present invention is to further specify the operation memory managing mechanism described above.

SECOND EMBODIMENT

In the second embodiment of the present invention, when the position of the vehicle varies in a state where a predetermined number of map segments have been loaded on the operation memory to display a travel guide map based on a previous location on the display unit, map segments reusable for displaying a travel guide map based on a new location are selected among the map segments loaded on the operation memory.

Then, the selected map segments are designated as properties, and remaining map segments are designated as victims.

In the second embodiment of the present invention, it is then determined whether the operation memory 200 is full. If it is determined that the operation memory 200 is not full, remaining map segments required for displaying a travel guide map based on a current vehicle location are retrieved from the physical storage medium with the entire map stored therein and are then updated into the operation memory.

On the contrary, if it is determined that the operation memory is full, the map segments which have been previously loaded on the operation memory 200 are sequentially deleted one by one in order to fill the interior of the operation memory 200 with map segments usable for displaying the travel guide map based on the current vehicle location.

Then, it is determined whether the deleted map segments are those designated as properties or victims.

If it is determined that the deleted map segments are those designated as properties, they are reinserted into the operation memory. If it is determined that the deleted map segments are those designated as victims, they are completely deleted from the operation memory. Thereafter, remaining map segments required for displaying the travel guide map based on the current vehicle location on the display unit are sequentially retrieved from the physical storage medium with the entire map stored therein and then are updated into the operation memory.

Here, it is preferred that predetermined different marks be assigned to the respective map segments designated as properties and victims so as to identify them, and the marks be initialized whenever the position of the vehicle varies.

According to the second embodiment of the present invention, when the travel guide map is generated again based on the new location as the position of the vehicle varies, map data loading speed can be faster by preventing reusable map segments among the map segments loaded on the operation memory from being unnecessarily deleted, retrieved again from the physical storage medium and inserted into the operation memory.

Next, the third embodiment of the present invention will be described with reference to FIG. 2.

THIRD EMBODIMENT

In the third embodiment of the present invention, the speed of loading map data on the screen memory, which has been required for displaying a travel guide map on the display unit, becomes faster by loading the map data of the travel guide map on the screen memory while minimizing the number of access to the physical storage medium such as a CD-ROM or hard disk.

To this end, in the third embodiment of the present invention, a certain number of map segments required for generating a travel guide map based on a new location are updated into the operation memory 200 as the position of the vehicle varies.

More specifically, a position information extracting section of the control unit 150 first calculates coordinates of a current vehicle location using GPS data received by the GPS receiver 100. Then, a map segment including the coordinates of the current vehicle location, and a predetermined number of adjacent map segments surrounding the map segment are detected.

Subsequently, the memory manager 210 searches the operation memory 200 under the control of the control unit 150, selects map segments identical with the map segments, which have been detected by the position information extracting section, among map segments stored in the operation memory 200, and deletes remaining map segments except the selected map segments from the operation memory 200.

Thereafter, remaining map segments required for generating the travel guide map based on the new location are retrieved from the physical storage medium with the entire map stored therein and are then updated into empty areas of the operation memory which are obtained by deleting the remaining map segments except the selected map segments.

Finally, the control unit 150 accesses to the operation memory 200 instead of the physical storage medium 120 with the entire map stored therein in response to a display request input from the outside, and loads the map segments updated into the operation memory 200 on the screen memory (not shown), thereby displaying the travel guide map on the display unit 140 using the map segments loaded on the screen memory as described above.

According to the third embodiment of the present invention, the map data loading speed becomes faster in such a manner that the certain number of map segments required for generating the travel guide map based on the new location as the position of the vehicle varies are detected and then updated into the operation memory, and the updated map segments are retrieved from the operation memory and then loaded on the screen memory.

Figure 3:
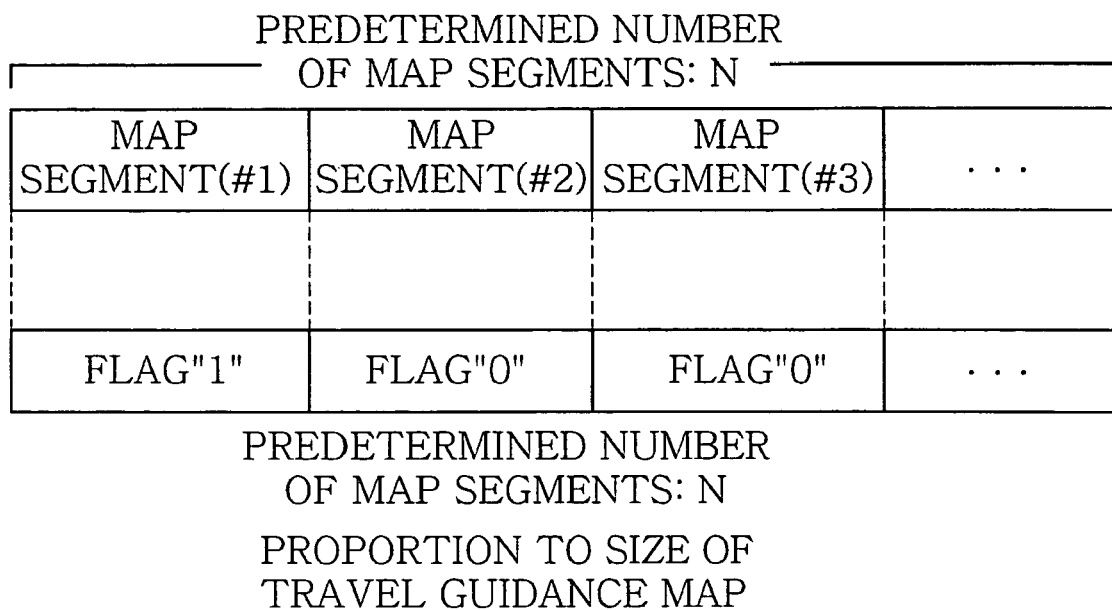
FIG. 3 is a view specifically illustrating an operation memory for use in the present invention.

Next, the operation memory 200 in the present invention will be described in greater detail with reference to FIG. 3.

In the present invention, a predetermined number of map segments required for displaying a travel guide map based on the position of a vehicle on the display unit are loaded on the operation memory. When the position of the vehicle varies, it is determined whether there are map segments usable for displaying a travel guide map based on a new location on the display unit, among the map segments loaded on the operation memory. Relevant usable map segments are selected and designated as properties and remaining map segments are designated as victims.

At this time, it is preferred that the map segments designated as the properties and victims be distinguishable from each other. To this end, it is preferred that, for example, a binary bit flag of "1" be assigned to the properties and a binary bit flag of "0" be assigned to the victims, as shown in the figure. The marks are initialized whenever the position of the vehicle varies.

To fill the interior of the operation memory 200 with the map segments usable for displaying the travel guide map based on the current vehicle location on the display unit, the map segments that have been previously loaded on the operation memory are sequentially deleted one by one.

At this time, if the deleted map segments are those designated as the properties, they are reinserted into the operation memory. If deleted map segments are those designated as the victims, they are completely deleted from the operation memory. Thereafter, remaining map segments required for displaying the travel guide map based on the new location on the display unit are sequentially retrieved from the physical storage medium with the entire map stored therein and are then updated into empty areas of the operation memory which are obtained by deleting the map segments.

As a result, the map data loading speed can be improved by lowering the possibility that latest data will be selected as victims and preventing deletion of data usable for displaying a travel guide map.

Next, the operation memory managing mechanism of the present invention will be described in greater detail with reference to FIG. 4.

In the operation memory managing mechanism of the present invention, map segments usable for displaying a travel guide map based on a current vehicle location on the display unit are selected among a predetermined number of map segments that have been loaded on the operation memory to display a travel guide map based on a previous location on the display unit, and the selected map segments are designated as properties and remaining map segments are designated as victims.

Then, to fill the operation memory with the map segments required for displaying the travel guide map based on the current vehicle location on the display unit, the map segments that have been loaded on the operation memory are sequentially deleted one by one.

At this time, it is determined whether the deleted map segments are those designated as properties or victims. If it is determined that the deleted map segments are those designated as the properties, they are reinserted into the operation memory.

Figure 4:
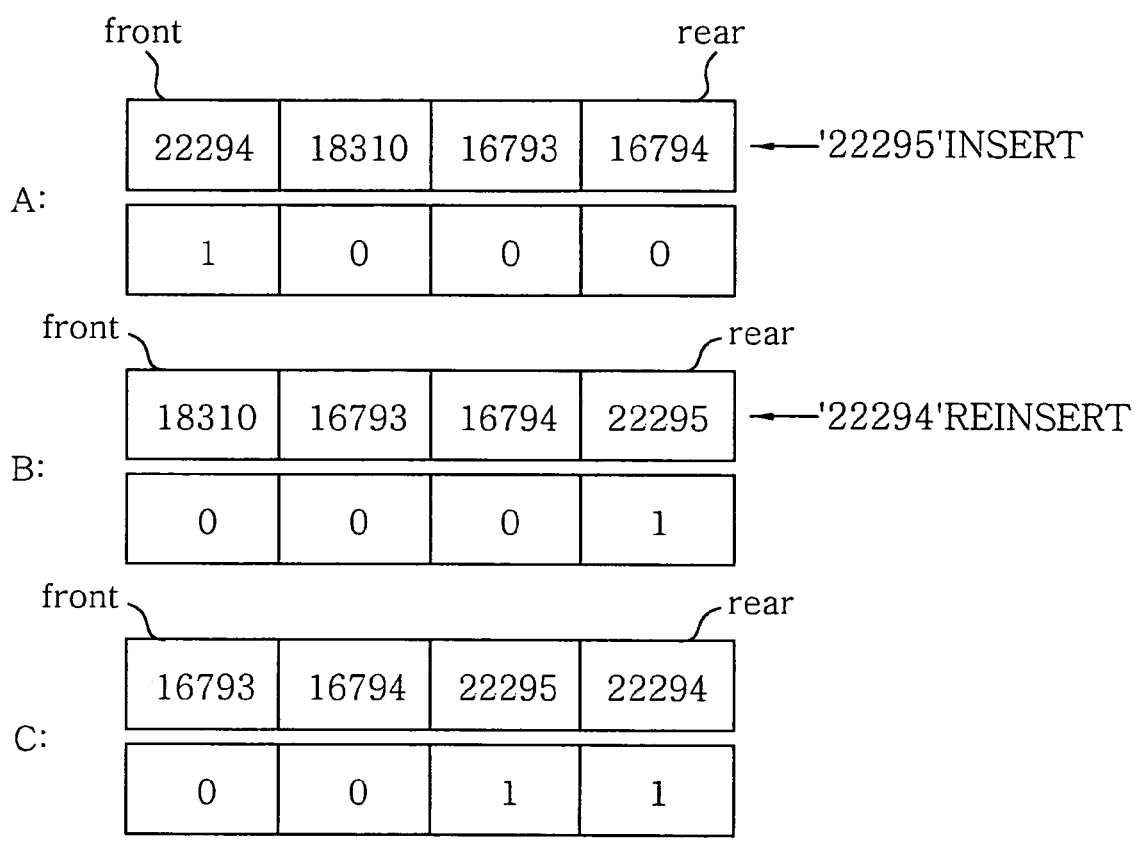
FIG. 4 is a view specifically illustrating an operation memory managing mechanism for use in the present invention.

For example, in a case where the operation memory is a cache memory managed through queues in the FIFO manner as shown in FIG. 4, in order to fill the cache memory with map segments required for displaying the travel guide map based on the current vehicle location on the display unit, it is first determined whether the cache memory is full. If it is determined that the cache memory is full, map segments loaded on the cache memory are sequentially deleted one by one.

As a result, map segment 22294 positioned at the front is deleted. However, since map segment 22294 is a map segment designated as a property with a flag of "1", it is reinserted into the rear even after the deletion thereof. In order to reinsert map segment 22294, map segment 18310 positioned at the front is deleted. At this time, since map segment 18310 is a map segment designated as a victim with a flag of "0", it is not reinserted into but completely deleted from the cache memory. Such processes are repeated until all map segments with the flag of "0" are deleted. If an empty area is produced in the cache memory, a map segment designated as a victim is reinserted into the cache memory, or data on a new map segment, i.e. a map segment usable for displaying the travel guide map based on the current vehicle location on the display unit, are retrieved from the physical storage medium and then inserted into the cache memory.

Accordingly, the present invention allows the operation memory such as a cache memory to be filled with the map segments required for displaying the travel guide map based on the current vehicle location on the display unit as the position of the vehicle varies.

Next, the operation memory managing mechanism of the present invention will be described by way of example with reference to FIG. 5.

Figure 5:
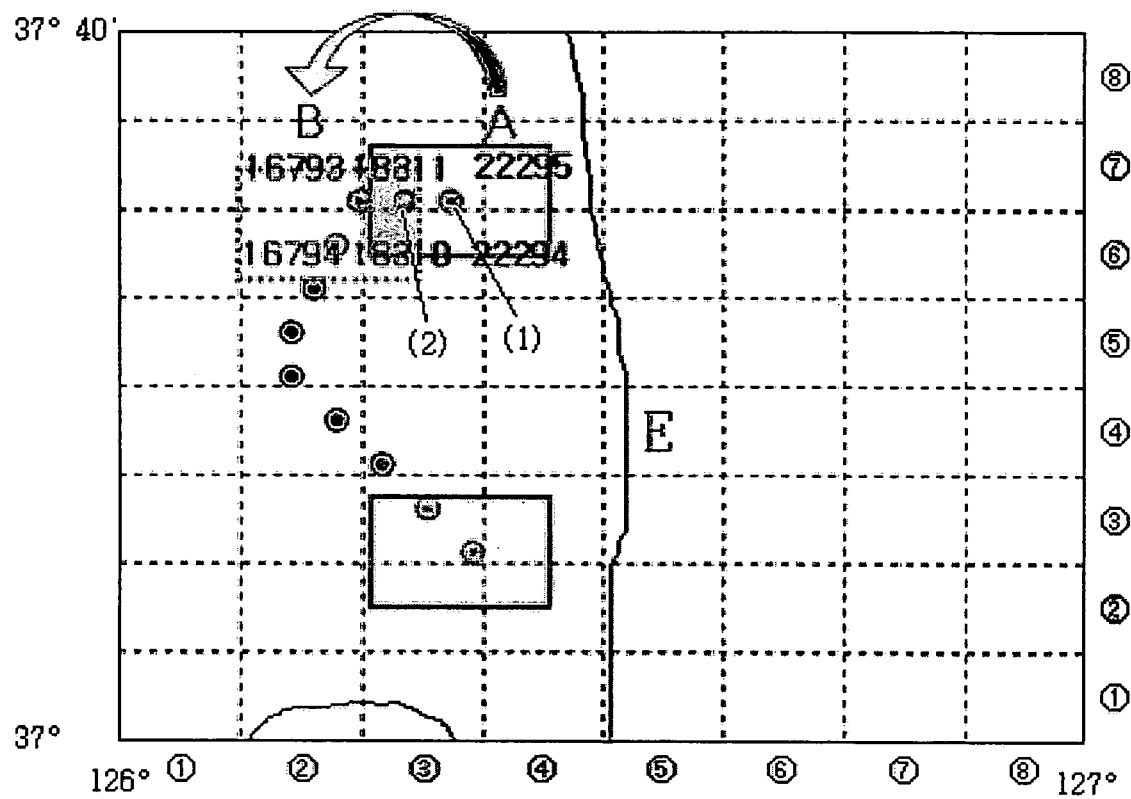
FIG. 5 is a view exemplarily illustrating an operation memory managing mechanism for use in the present invention.

In the operation memory managing mechanism of the present invention shown in FIG. 5, the number of map segments required for a travel guide map on the display unit is set to 4, and the number of areas managed in the operation memory is accordingly set to 4. "A→B" indicates a travel direction of a vehicle denoted by symbol ●.

As shown in FIG. 5, as the position of the vehicle varies from position (1) to position (2), map segments 18311 and 18310 usable for displaying a travel guide map based on a current vehicle location, position (2), on the display unit are selected among a predetermined number of map segments, i.e. map segments 18311, 22295, 18310 and 22294, which have been loaded on the operation memory to display a travel guide map based on a previous location, position (1), on the display unit. A mark for identifying a property is assigned to the selected map segments in accordance with the present invention.

Thereafter, to fill the operation memory with map segments required for displaying the travel guide map based on current position (2) on the display unit, the map segments that have been loaded on the operation memory are sequentially deleted one by one.

At this time, since the mark for identifying the property has been assigned to map segments 18311 and 18310, map segments 18311 and 18310 are reinserted even though they have been deleted at their turns. Only new map segments 16793 and 16794 that have not been loaded on the operation memory are retrieved from the physical storage medium and newly inserted into the operation memory. Therefore, when a travel guide map based on a new location is generated, the number of access to the physical storage medium such as a CD-ROM or hard disk can be reduced, thereby improving memory loading speed for displaying the map.

Next, the preferred embodiments of the present invention will be sequentially described with reference to FIGS. 6 to 8.

In the first embodiment of the present invention, when a travel guide map based on a new location is generated again as the position of a vehicle, only a certain number of map segments are retrieved from the physical storage medium such as a CD-ROM or hard disk to generated the travel guide map, thereby making map displaying speed faster.

To this end, in the first embodiment of the present invention, map segments required from displaying a travel guide map based on a current vehicle location on the display unit are first selected among a predetermined number of map segments that have been loaded on the operation memory to display a travel guide map based on a previous location on the display unit.

Figure 6:
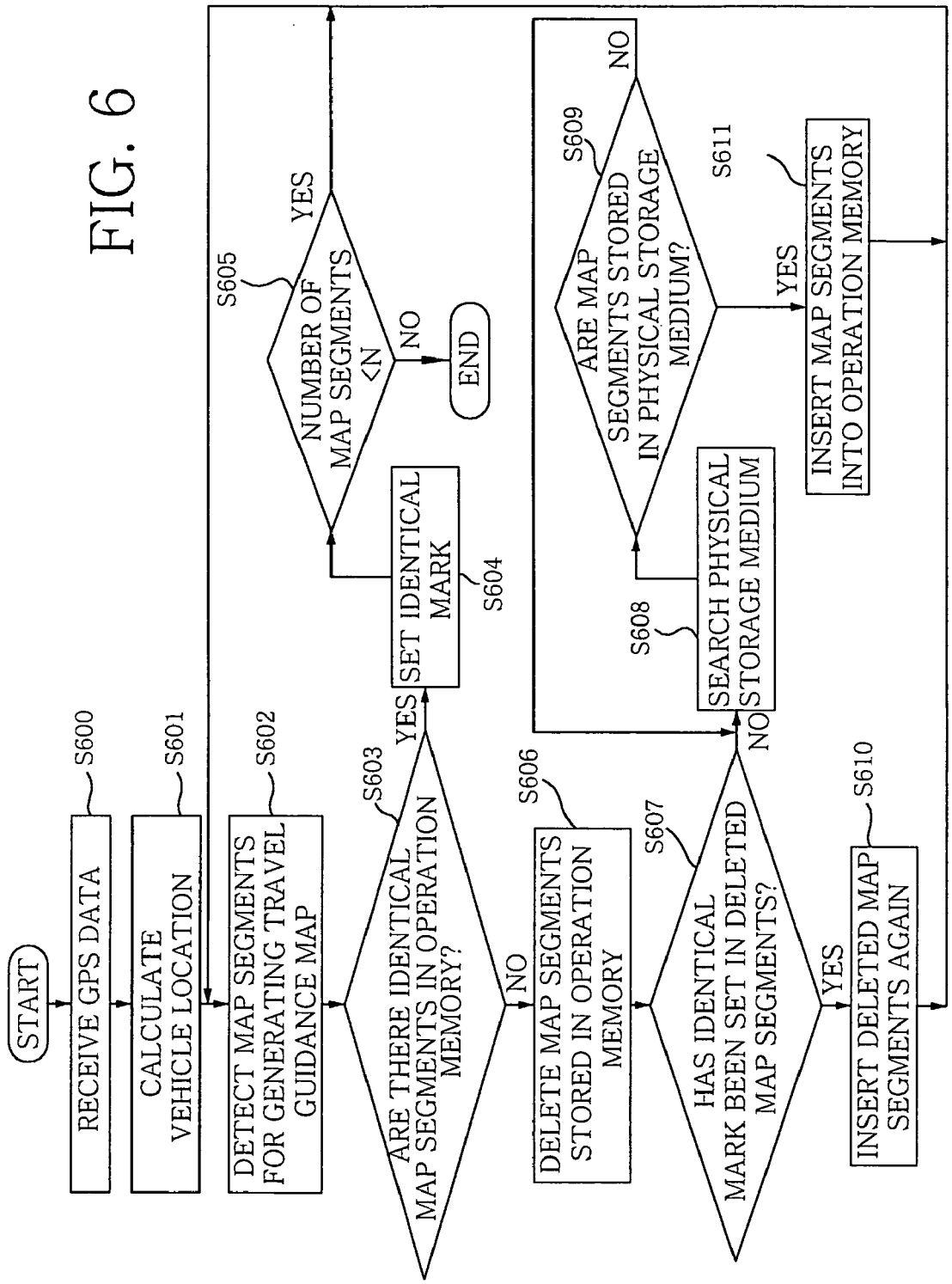
FIG. 6 is a flowchart illustrating a first embodiment of the present invention.

That is, as shown in FIG. 6, GPS data are received (S600) and a current vehicle location is calculated from the received GPS data (S601). To display a map with a predetermined size on the display unit, a central map segment including coordinates of the location calculated in step S601, and a predetermined number of adjacent map segments surrounding the central map segment are detected (S602).

Further, map segments identical with the detected central map segment and adjacent map segments among a predetermined number of map segments that have been loaded on the operation memory to display a travel guide map based on a previous location are selected as map segments usable for displaying a travel guide map based on the current vehicle location on the display unit (S603).

At this time, the adjacent map segments are sequentially detected according to the degree of proximity to the central map segment, and the entire map is preferably a map divided into map segments with a predetermined size based on latitude and longitude.

Meanwhile, the map segments selected as those usable for displaying the travel guide map based on the current vehicle location on the display unit as described above are designated as properties (S604), and remaining map segments are designated as victims.

At this time, it is preferred that predetermined different marks be assigned to the map segments to identify those designated as the properties and victims. For example, it is preferred that a binary bit flag of "1" be assigned to the properties, while a binary bit flag of "0" be assigned to the victims. The marks are initialized whenever the position of the vehicle varies.

In the first embodiment of the present invention, as for the map segments designated as the properties, they are reinserted into the operation memory (S610) even though they have been deleted from the operation memory in a predetermined order, e.g., in the FIFO manner (S606, S607). For example, the map segments designated as the properties are deleted at their turns in the FIFO manner. The deleted map segments are added to an insertion queue, and the map segments added to the insertion queue are reinserted into the operation memory in a relevant order.

On the other hand, the map segments designated as the victims are completely deleted from the operation memory, and remaining map segments required for displaying the travel guide map based on the current vehicle location are retrieved from the physical storage medium with the entire map stored therein (S608, S609) and are then updated into the operation memory (S611). At this time, the map segments designated as the victims are deleted from the operation memory in the practicable FIFO manner, and the map segments retrieved from the physical storage medium are inserted into the operation memory.

The map segments updated into the operation memory in such a manner, and the map segments designated in advance as the properties are loaded on a screen memory.

As a result, according to the first embodiment of the present invention, when a travel guide map is generated again based on a new location as the position of the vehicle varies, only a certain number of map segments are retrieved from the physical storage medium such as a CD-ROM or hard disk to generate the travel guide map, thereby making map-displaying speed faster.

Next, the second embodiment of the present invention will be described with reference to FIG. 7. The second embodiment of the present invention is to further specify the operation memory managing mechanism.

Figure 7:
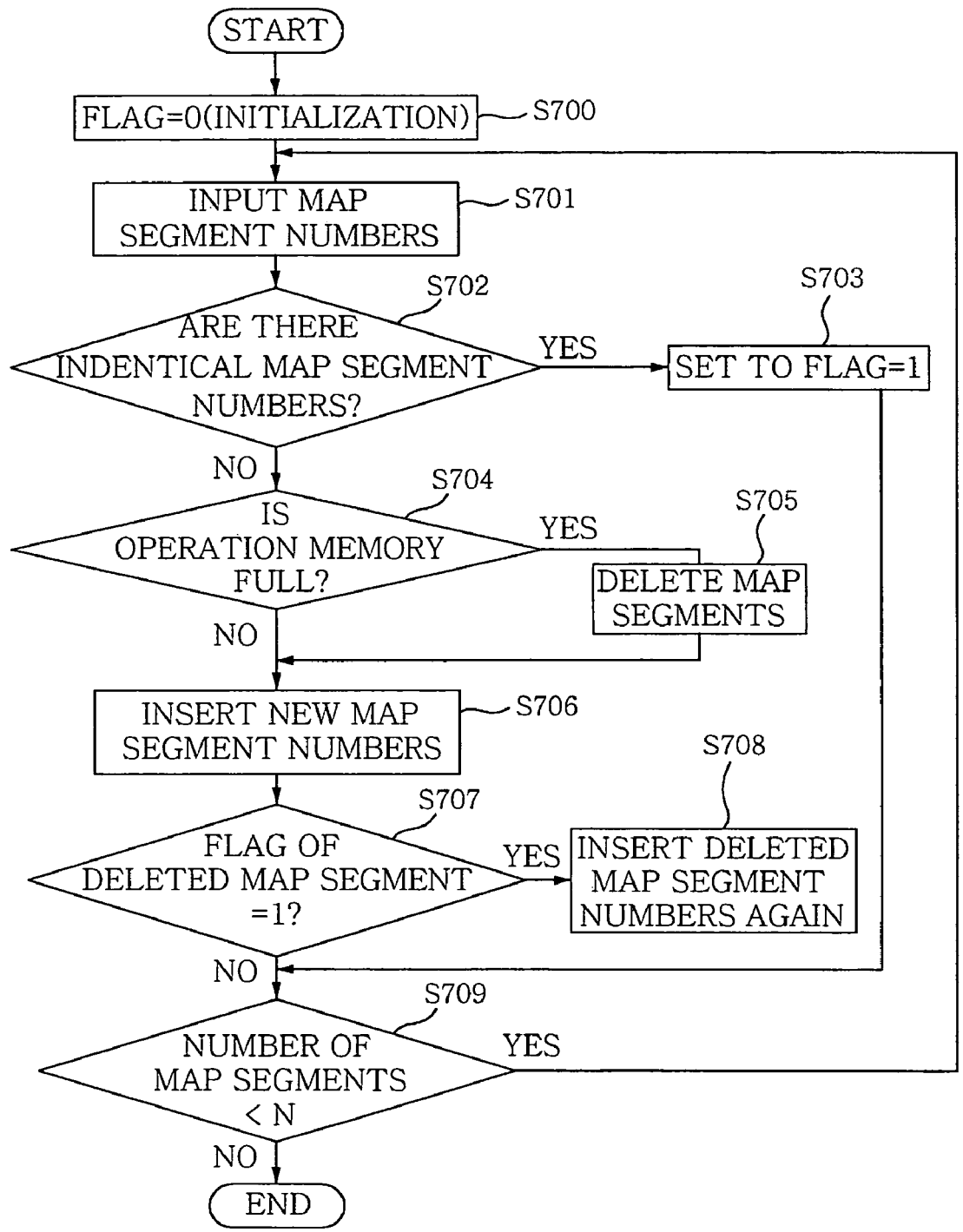
FIG. 7 is a flowchart illustrating a second embodiment of the present invention.
Figure 8:
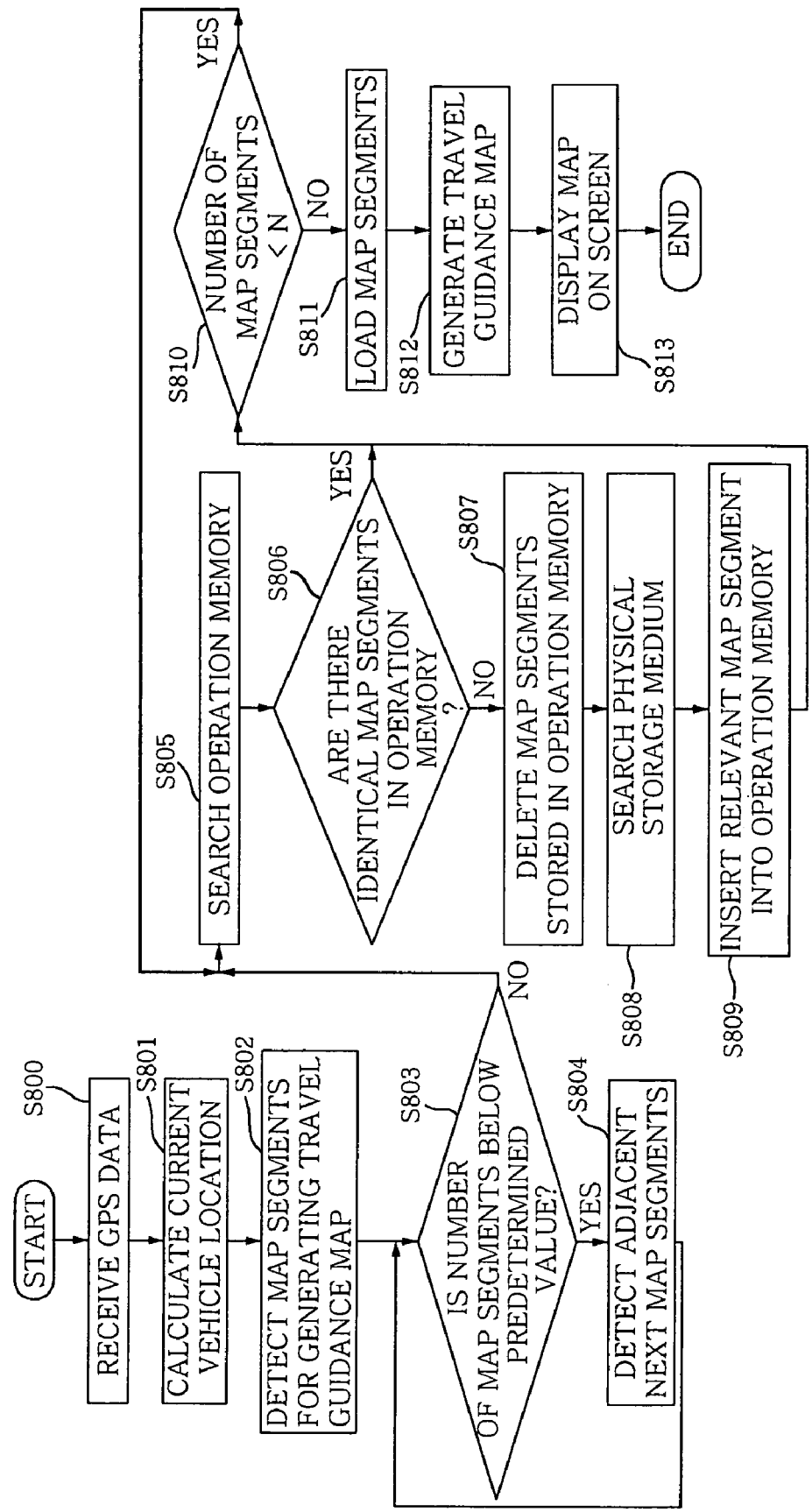
FIG. 8 is a flowchart illustrating a third embodiment of the present invention.

As shown in FIG. 7, in the second embodiment of the present invention, when the position of a vehicle varies in a state where a predetermined number of map segments have been loaded on the operation memory to display a travel guide map based on a previous location on the display unit, flags that have been assigned to the map segments loaded on the operation memory are initialized (S700).

Then, map segment numbers required for displaying a travel guide map based on a new location on the display unit are received from the control unit (S701), and the map segment numbers loaded on the operation memory are compared with the map segment numbers received in step S701 (S702).

Using the comparison results, map segments usable for displaying the travel guide map based on the new location on the display unit are selected among the map segments loaded on the operation memory (S702).

Thereafter, the selected map segments are designated as properties, and remaining map segments are designated as victims.

In the second embodiment of the present invention, it is then determined whether the operation memory is full (S704). If it is determined that the operation memory is not full, remaining map segments required for displaying a travel guide map based on a current vehicle location are retrieved from the physical storage medium with the entire map stored therein and are then updated into the operation memory (S706).

On the contrary, if it is determined that the operation memory is full, the map segments which have been previously loaded on the operation memory are sequentially deleted one by one in order to fill the interior of the operation memory with map segments usable for displaying the travel guide map based on the current vehicle location (S705).

Then, it is determined whether the deleted map segments are those designated as properties or victims (S707).

If it is determined that the deleted map segments are those designated as properties, they are reinserted into the operation memory (S708). If it is determined that the deleted map segments are those designated as victims, they are completely deleted from the operation memory. Thereafter, remaining map segments required for displaying the travel guide map based on the current vehicle location on the display unit are sequentially retrieved from the physical storage medium with the entire map stored therein and then are updated into the operation memory.

Here, it is preferred that predetermined different marks be assigned to the respective map segments designated as properties and victims so as to identify them, and the marks be initialized whenever the position of the vehicle varies.

According to the second embodiment of the present invention, when the travel guide map is generated again based on the new location as the position of the vehicle varies, map data loading speed can be faster by preventing reusable map segments among the map segments loaded on the operation memory from being unnecessarily deleted, retrieved again from the physical storage medium and inserted into the operation memory.

Finally, the third embodiment of the present invention will be described with reference to FIG. 8.

In the third embodiment of the present invention, the speed of loading map data on the screen memory, which has been required for displaying a travel guide map on the display unit, becomes faster by loading the map data of the travel guide map on the screen memory while minimizing the number of access to the physical storage medium such as a CD-ROM.

To this end, in the third embodiment of the present invention, a certain number of map segments required for generating a travel guide map based on a new location are updated into the operation memory as the position of the vehicle varies.

More specifically, GPS data are first received (S800), and coordinates of a current vehicle location is calculated using the GPS data (S801). Then, a map segment including the coordinates of the current vehicle location, and a predetermined number of adjacent map segments surrounding the map segment are detected (S802, S803, S804).

Subsequently, the operation memory is searched (S805), map segments identical with the detected map segments are selected among map segments stored in the operation memory (S806), and remaining map segments except the selected map segments are deleted from the operation memory (S807).

Thereafter, the physical storage medium with the entire map stored therein is searched (S808) to retrieve remaining map segments required for generating the travel guide map based on the new position, and the retrieved map segments are then updated into empty are as of the operation memory which are obtained by deleting the map segments (S809).

Finally, access is made to the operation memory instead of the physical storage medium with the entire map stored therein in response to a display request input from the outside, and the map segments updated into the operation memory are loaded on the screen memory (not shown) as described above (S811), thereby displaying the travel guide map generated in step S812 on the display unit using the map segments loaded on the screen memory (S813).

According to the third embodiment of the present invention, the map data loading speed becomes faster in such a manner that the certain number of map segments required for generating the travel guide map based on the new location as the position of the vehicle varies are detected and then updated into the operation memory, and the updated map segments are retrieved from the operation memory and then loaded on the screen memory.

With the method for managing map data for a vehicle according to the present invention described above, upon display of the map data on a display unit, the number of access to a physical storage medium with an entire map stored therein is decreased to reduce access overhead, thereby improving the displaying speed of the map data. Further, there is an advantage in that map segments reusable as the vehicle travels are prevented from being designated as victims, thereby making the loading of the map data on a memory faster.

Although the present invention has been illustrated and described in connection with the preferred embodiment, it will be readily understood by those skilled in the art that various modifications and changes can be made thereto without departing from the spirit and scope of the present invention defined by the appended claims, and such modifications and changes will fall within the scope of the present invention.

What is claimed is:

1. A method for managing map data for a vehicle, the method comprising:

selecting map segments usable for displaying a travel guide map based on a current vehicle location from among a predetermined number of map segments which were loaded in an operation memory in order to display a travel guide map on a display unit based on a previous vehicle location;

designating the selected map segments as properties, and remaining map segments as victims; and deleting the map segments designated as the victims, retrieving remaining map segments required for displaying the travel guide map based on the current vehicle location from a physical storage medium in which an entire map is stored, and updating the operation memory with the retrieved map segments.

2. The method as claimed in claim 1, further comprising:
loading the map segments in the updated operation memory and the map segments designated as the properties in a screen memory.

3. The method of claim 2, wherein the operation memory comprises a cache memory.

4. The method as claimed in claim 1, wherein selecting the map segments comprises:
calculating coordinates of the current vehicle location using GPS data received by a GPS receiver;
detecting a central map segment including the calculated coordinates of the current vehicle location and a predetermined number of adjacent map segments surrounding the central map segment to display a map with a predetermined size on the display unit; and
selecting map segments, which are identical to the detected central map segment and adjacent map segments from among the predetermined number of the map segments loaded in the operation memory to display the travel guide map based on the previous vehicle location, as map segments usable for displaying the travel guide map based on the current vehicle location.

5. The method as claimed in claim 4, wherein the adjacent map segments are detected based on a degree of proximity to the central map segment.

6. The method of claim 5, wherein the operation memory comprises a cache memory.

7. The method of claim 4, wherein the operation memory comprises a cache memory.

8. The method as claimed in claim 1, wherein the entire map is a map divided into map segments with a predetermined size based on latitude and longitude.

9. The method of claim 8, wherein the operation memory comprises a cache memory.

10. The method as claimed in claim 1, wherein deleting the map segments comprises:
deleting the map segments designated as the victims from the operation memory in a first-in first-out (FIFO) manner, and inserting the map segments retrieved from the physical storage medium into the operation memory.

11. The method of claim 10, wherein the operation memory comprises a cache memory.

12. The method as claimed in claim 1, further comprising:
assigning predetermined marks to the map segments designated as the properties and the victims to identify the map segments before deleting the map segments.

13. The method as claimed in claim 12, wherein the marks are initialized whenever a position of the vehicle varies.

14. The method of claim 13, wherein the operation memory comprises a cache memory.

15. The method as claimed in claim 12, wherein the marks are assigned to the map segments such that a binary bit flag of "1" is assigned to the properties while a binary bit flag of "0" is assigned to the victims.

16. The method of claim 15, wherein the operation memory comprises a cache memory.

17. The method as claimed in claim 12, further comprising:
managing the map segments designated as the properties such that the properties can be reinserted even though the properties have been deleted from the operation memory in a first-in first-out (FIFO) manner after assigning the predetermined marks.

18. The method as claimed in claim 17, wherein managing the map segments comprises:
deleting the map segments designated as the properties at their turns in the FIFO manner;
adding the deleted map segments to an insertion queue; and
reinserting the map segments added to the insertion queue to the operation memory in a relevant order.

19. The method of claim 18, wherein the operation memory comprises a cache memory.

20. The method of claim 17, wherein the operation memory comprises a cache memory.

21. The method of claim 12, wherein the operation memory comprises a cache memory.

22. The method of claim 1, wherein the operation memory comprises a cache memory.

23. A method for managing map data for a vehicle, the method comprising:
selecting map segments usable for displaying a travel guide map based on a current vehicle location from among a predetermined number of map segments which were loaded in an operation memory in order to display a travel guide map on a display unit based on a previous vehicle location;
designating the selected map segments as properties, and remaining map segments as victims;
deleting the map segments loaded in the operation memory one-by-one in a sequential manner such that the operation memory is filled with the map segments usable for displaying the travel guide map based on the current vehicle location;
determining whether the deleted map segments are map segments designated as the properties or victims;
reinserting the deleted map segments in the operation memory if the deleted map segments are map segments designated as properties.

24. The method as claimed in claim 23, further comprising:
completely deleting the map segments from the operation memory, sequentially retrieving remaining map segments required for displaying the travel guide map based on the current vehicle location from a physical storage medium in which an entire map is stored, and updating the operation memory with the retrieved map segments if the deleted map segments are map segments designated as victims.

25. The method of claim 24, wherein the operation memory comprises a cache memory.

26. The method as claimed in claim 23, wherein the designation of the map segments as properties and the victims is performed using predetermined different marks.

27. The method as claimed in claim 26, wherein the marks are initialized whenever a position of the vehicle varies.

28. The method of claim 27, wherein the operation memory comprises a cache memory.

29. The method of claim 26, wherein the operation memory comprises a cache memory.

30. The method as claimed in claim 23, further comprising:
determining whether the operation memory is full after designating the selected map segments and before deleting the map segments loaded in the operation memory.

31. The method as claimed in claim 30, further comprising:
sequentially retrieving remaining map segments required for displaying the travel guide map based on the current vehicle location from a physical storage medium in which an entire map is stored, and updating the operation memory with the retrieved map segments if it is determined that the operation memory is not full.

32. The method of claim 31, wherein the operation memory comprises a cache memory.

33. The method of claim 30, wherein the operation memory comprises a cache memory.

34. The method of claim 23, wherein the operation memory comprises a cache memory.

35. A method for managing map data for a vehicle, the method comprising:
detecting a predetermined number of map segments required for displaying a travel guide map on a display unit based on a new vehicle location as a position of the vehicle varies, and updating an operation memory with the detected map segments; and
accessing the operation memory instead of a physical storage medium in which an entire map is stored in response to a display request input from a user, and loading the map segments in the updated operation memory in a screen memory.

36. The method as claimed in claim 35, wherein detecting the predetermined number of map segments comprises:
detecting the predetermined number of map segments required for displaying the travel guide map based on the new location as the position of the vehicle varies;
searching the operation memory, and selecting map segments identical to the detected map segments from among a predetermined number of map segments which have been loaded in the operation memory in order to display the travel guide map based on a previous vehicle location;
deleting remaining map segments except the selected map segments; and
retrieving remaining map segments required for displaying the travel guide map based on the new vehicle location from the physical storage medium in which the entire map is stored, and replacing the remaining map segments deleted from the operation memory with the retrieved map segments.

37. The method as claimed in claim 36, wherein detecting the predetermined number of map segments comprises:
calculating coordinates of the current vehicle location using GPS data received by a GPS receiver; and
detecting a central map segment including the calculated coordinates of the current vehicle location and a predetermined number of adjacent map segments surrounding the central map segment in order to display a map with a predetermined size.

38. The method of claim 37, wherein the operation memory comprises a cache memory.

39. The method of claim 36, wherein the operation memory comprises a cache memory.

40. The method of claim 35, wherein the operation memory comprises a cache memory.

* * * * *